(12) United States Patent
Varadarajan

(10) Patent No.: US 8,671,353 B1
(45) Date of Patent: Mar. 11, 2014

(54) USE OF A RELATIONSHIP GRAPH FOR PRODUCT DISCOVERY

(75) Inventor: Anand Varadarajan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 637 days.

(21) Appl. No.: 12/966,093

(22) Filed: Dec. 13, 2010

(51) Int. Cl.
*G06F 3/033* (2013.01)

(52) U.S. Cl.
USPC .......................................................... 715/763

(58) Field of Classification Search
USPC ......................................... 715/863, 853, 764
See application file for complete search history.

(56) References Cited

U.S. PATENT DOCUMENTS

| | | | |
|---|---|---|---|
| 6,144,962 A * | 11/2000 | Weinberg et al. ..................... | 1/1 |
| 7,315,858 B2 * | 1/2008 | Potok et al. .......................... | 1/1 |
| 7,716,226 B2 * | 5/2010 | Barney .......................... | 707/748 |
| 7,984,389 B2 * | 7/2011 | Rusu et al. ..................... | 715/855 |
| 8,326,823 B2 * | 12/2012 | Grandhi et al. ................ | 707/717 |
| 2007/0011146 A1 * | 1/2007 | Holbrook .......................... | 707/3 |
| 2009/0259647 A1 * | 10/2009 | Curtis ................................ | 707/5 |
| 2011/0037766 A1 * | 2/2011 | Judy et al. ..................... | 345/440 |

\* cited by examiner

*Primary Examiner* — Omar Abdul-Ali
(74) *Attorney, Agent, or Firm* — McCormick, Paulding & Huber LLP

(57) ABSTRACT

A graph including a hub corresponding to a selected or primary item or keyword and a plurality of nodes corresponding to related or secondary items or keywords may be used to express the relationships between items or keywords. Optionally, the graph may include a plurality of tethers extending between the hub and each of the nodes. When used in Internet-based commerce, the relationship graph may recommend related secondary items to a customer who is searching for a primary item, and may further express the degree of relationship between the primary item and each of the secondary items. When the customer selects a node corresponding to a secondary item, a new set of nodes corresponding to tertiary items related to the selected secondary item may be displayed. In this manner, the relationships between the primary item and more distant tertiary items may also be represented to the customer.

36 Claims, 11 Drawing Sheets

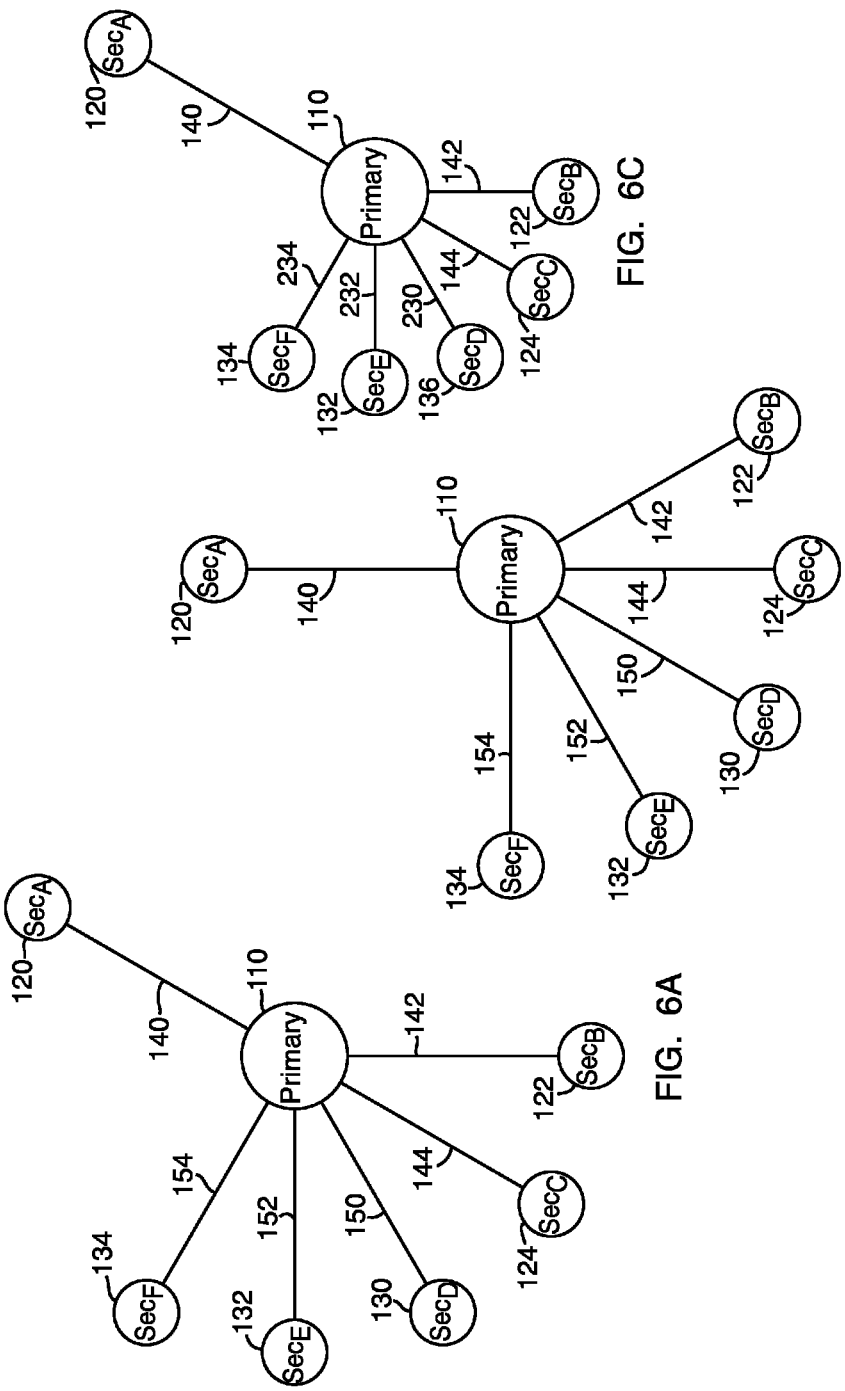

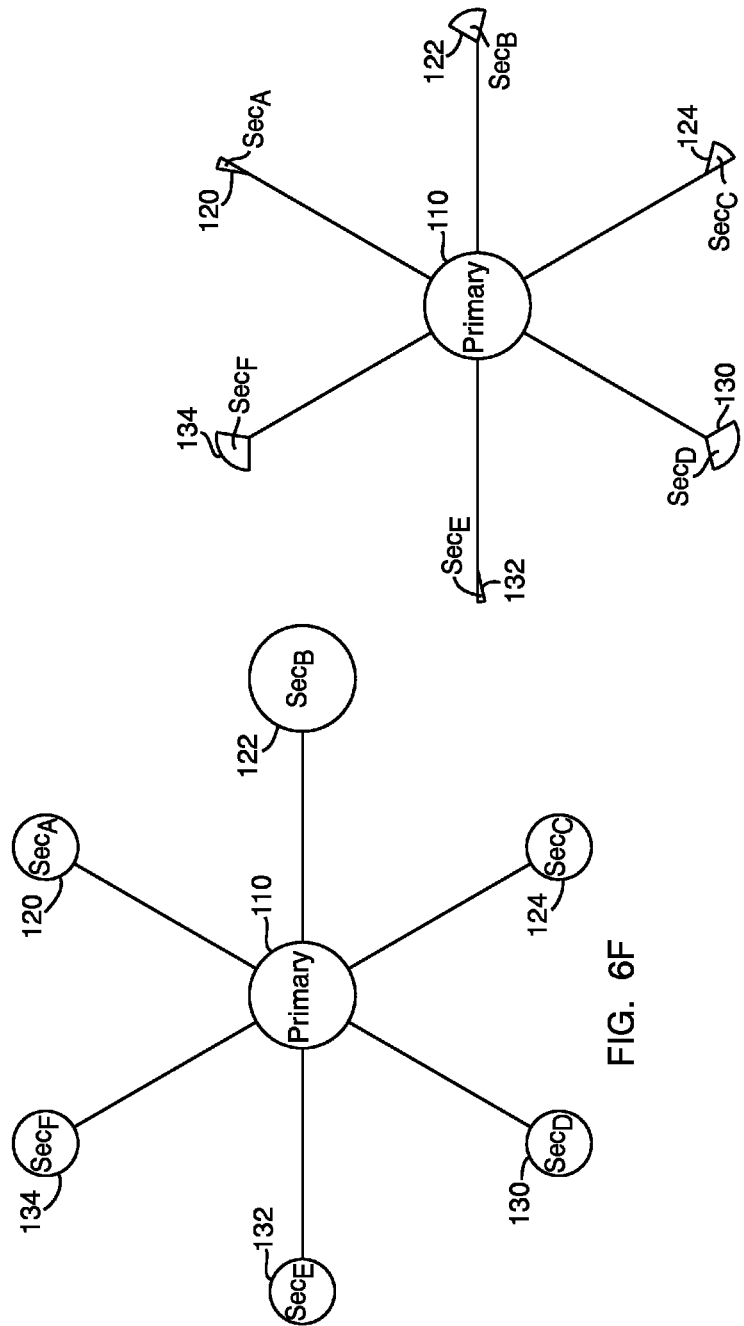

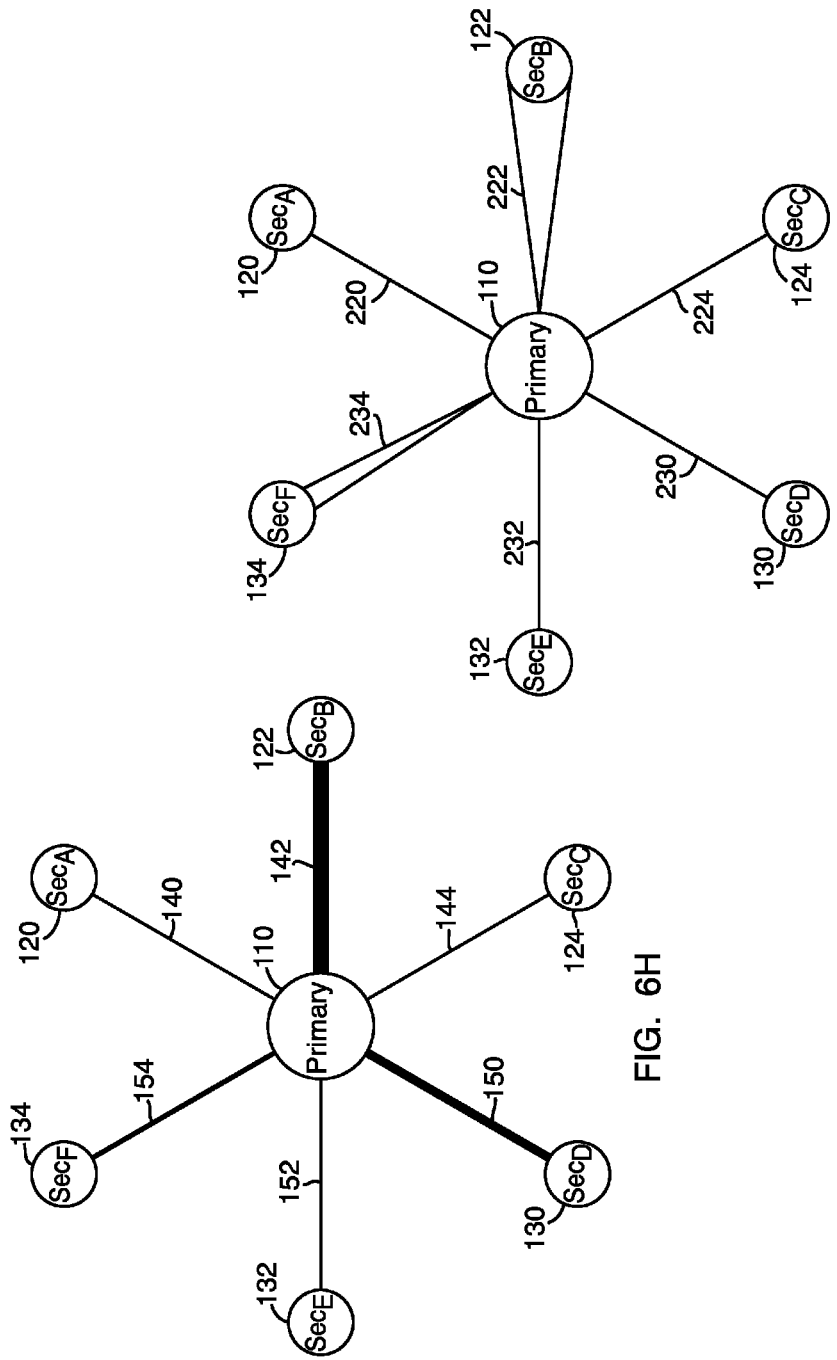

USE OF A RELATIONSHIP GRAPH FOR PRODUCT DISCOVERY

BACKGROUND OF THE INVENTION

Consumers who are interested in identifying or discovering items for purchase using computer-based systems or methods may generally do so in one of two ways. First, consumers may search for items or categories of items by entering a keyword into a search engine, which then returns information relating to one or more items or categories of items for review by the user. Second, consumers may also browse through broad lists of items or categories of items in an electronic catalog, and may select a keyword pertaining to an item or a category of items for review and consideration.

Searching and browsing for items online may have limited effectiveness, however, for several reasons. First, the quality of the information returned through searching or browsing is only as good as the keyword entered or selected by a user. In the event that the information returned through searching or browsing is not satisfactory, a user must start over again, and repeat the process using new keywords or categories. Next, while the relationship between the keyword searched or browsed and the information returned may be readily apparent, how that information relates to other items or keywords cannot be determined until subsequent searches or selections are performed. Finally, systems and methods for searching and browsing are typically unable to express degrees of association between a keyword entered or selected by a user and other keywords. Therefore, identifying items for purchase online frequently depends on a consumer's willingness and ability to repeat the searching and browsing process through multiple iterations, and can be inefficient.

Systems and methods for determining and presenting relationships between a selected item and other related items are known to those of skill in the art. For example, U.S. Pat. No. 6,266,649 B1 to Linden et al., which is incorporated by reference in its entirety herein, is directed to computer-implemented systems and methods for generating personalized recommendations of items based on the collective interests of a community of users. Linden describes systems and methods for mapping items to other similar items on a periodic basis by identifying correlations between the known interests of users of particular items, and presenting a list of recommended items to a user who is interested in purchasing an item.

However, the systems and methods described in Linden are one-dimensional, in that searching for one item results in a list of related items and nothing more, and the methods described in Linden must be repeated in order to return multiple sets of results. Moreover, the related items provided by the systems and methods described in Linden are presented in a list form only, and Linden does not enable a user to view a degree of association between the originally entered item and each of the related items in the list. The systems and methods discussed in Linden also do not inform a user whether any relationships between the related items exist.

BRIEF DESCRIPTION OF THE DRAWINGS

FIGS. 6A-6K are embodiments of relationship graphs in accordance with embodiments of the present disclosure.

DETAILED DESCRIPTION

Figure 1:
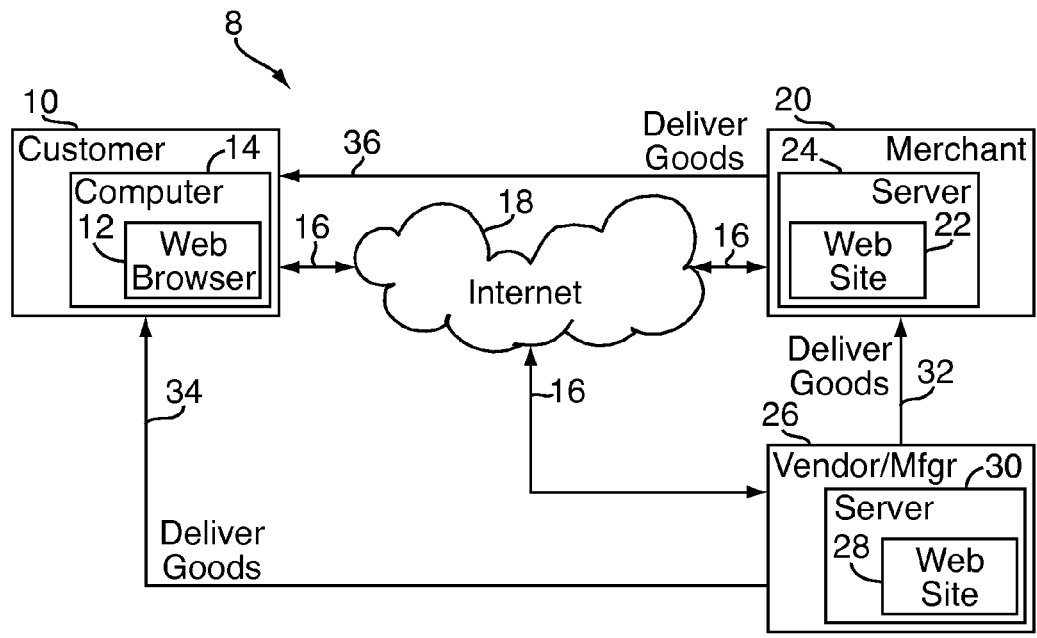
FIG. 1 is a block diagram of the components of a customer-merchant shopping system, in accordance with embodiments of the present disclosure.

As is set forth in greater detail below, the present disclosure is directed to systems and methods for representing relationships between various items or categories of items in a graphical format. Specifically, the present disclosure describes systems and methods that permit Internet-based merchants to portray the relationships between a keyword and other keywords in a graphical layout that enables a user to easily view and select from multiple items or categories of items based on the entry or selection of a single keyword.

For example, when Jonathan enters the keyword "football" into a search engine at a merchant website that sells or otherwise makes available many different products, the systems and methods of the present invention may then be encoded to display a hub corresponding to the keyword "football" and a first set of nodes corresponding to keywords that may be related to "football," such as "tickets," "jersey," "video game," "Super Bowl," "helmet," and "cleats." The first set of nodes may be displayed around the hub in a graphical arrangement that depicts the relationships of each of the represented items or categories to "football." Optionally, the nodes may be visually linked to the hub, for example, by a first set of tethers extending between the hub and each of the first set of nodes, like the spokes of a wheel. The nodes and/or the tethers may be sized, colored or otherwise selected in such a way that expresses a characteristic of the hub or the nodes, or a relationship between the hub and each of the nodes.

After the graphical arrangement of the hub and the nodes is displayed, Jonathan may then select one of the nodes from the first set by any standard means, such as a mouse-over, a mouse-click, a keyboard entry, or any other known computer method of selection. When Jonathan selects one of the nodes of the first set, a second set of nodes may appear on the screen positioned around the first selected node, which then itself acts as a hub to the nodes of the second set, and may be visually linked to the first selected node by a second set of tethers extending between the first selected node and each of the nodes in the second set. For example, when Jonathan selects the node corresponding to "helmet," a second set of nodes corresponding to "hockey," "bicycle," "Darth Vader," "skateboard" and "motorcycle" may be displayed along with the hub corresponding to "football" around the node corresponding to "helmet," and each of the second set of nodes may be visually linked to the first selected node by a second set of tethers. Jonathan may then select one of the nodes of the second set, and a third set of nodes may appear. For example, if Jonathan selects the node corresponding to "bicycle," a set of nodes corresponding to "tire," "chain," "backpack," "Tour de France" and "training" may be displayed around the node corresponding to "bicycle," which acts as a hub to the nodes of the third set, along with the node corresponding to "helmet." The nodes of the third set may be visually linked to the second selected node by a third set of tethers extending between the second selected node and each of the nodes in the third set.

Jonathan may also manipulate the graphical arrangement in order to navigate through the keywords or items represented therein, to view more or fewer nodes, or to select between or among the keywords or items. For example, Jonathan may zoom in or zoom out on the hub or on a particular node, or on a particular area of the graphical arrangement, and such zooming may result in the display of more or fewer nodes. Jonathan may also pan the graphical arrangement in any direction on the display, which may also result in the display of more or fewer nodes, including nodes of varying degrees of association, on the graphical arrangement. Jonathan may further configure the graphical arrangement to appear in any alignment on the display, such as by centering the graphical arrangement on the hub, on a node or on any particular area of the graphical arrangement, or by rotating or otherwise repositioning the graphical arrangement on the display.

Therefore, in accordance with one embodiment, the present invention may present Jonathan with a graphical representation of the relationship between a number of items or categories of items and the keyword "football," and may also expose Jonathan to items such as "tire," "chain," "backpack," "Tour de France" or "training," which may bear a relationship to the keyword "football" that was not immediately apparent when the keyword was first entered into the search engine. The relationships between the items or categories of items and the keyword "football" may be represented through the selection of various characteristics of the hub, the nodes and/or the tethers. Further, Jonathan may control or otherwise manipulate the relationship graph to simply and easily review and select one or more items or categories of items from the relationship graph.

FIG. 1 illustrates the various components of an embodiment of an interactive system that may be used in accordance with the present disclosure, such as a customer-merchant client-server based ordering system 8, which includes a customer 10 (or user or consumer or client or shopper or buyer) and an e-commerce or Internet-based merchant (or supplier or retailer or seller or reseller or distributor) 20. The customer 10 can be any entity or individual that wishes to purchase, rent, lease, borrow, or otherwise obtain items (e.g., goods, products, services, information or media of any type or form) from the merchant 20 using a client application, such as a web browser 12 running on a computer 14. The merchant 20 is an entity that sells or otherwise makes items available for purchase, rent, lease or borrowing by customer 10 from a merchant website 22 which is implemented using one or more physical computer servers 24. The customer computer 14 is connected to or otherwise communicates with the merchant server 24 through a communications network 18, such as the Internet, as indicated by lines 16, by sending and receiving of digital data over the communications network 18. The customer 10 uses the web browser 12 as a user interface to view and/or communicate with the merchant website 22 that is displayed on the customer computer 14.

In addition, one or more of the items ordered by the customer 10 may be made by or obtained from one or more third party vendors (or manufacturers) 26. Also, the merchant 20 may be the vendor 26. The vendor 26 is an entity that manufactures goods or has access to items that the merchant 20 desires to supply to the customer 10 and may sell the items to the merchant 20 through a vendor website (or other type of order processor) 28, which is implemented using one or more physical computer servers 30. The vendor computer server 30 is connected to or communicates with the merchant server 24 and the customer computer 14, through the communications network 18, as indicated by lines 16. If used by the merchant 20, the vendor 26 may deliver the desired items to either the merchant 20 or to the customer 10, as indicated by the lines 32, 34 respectively. If the goods are delivered to the merchant 20 from the vendor 26, the merchant 20 delivers the items to the customer, as indicated by a line 32. There may be more than one vendor 26 that supplies items to the merchant 20 and/or the customer 10. Also, those of skill in the pertinent art will recognize that the customer 10 may use a keyboard, keypad, mouse, stylist, touch screen, or other device (not shown) or method for interacting with the computer 14 and/or web browser 12, or to "select" an item, link, node, hub or any other aspect of the present disclosure.

The computers, servers, and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein.

Except where otherwise explicitly or implicitly indicated herein, the term "merchant" or "vendor" refers to the associated computer systems operated or controlled by a merchant or vendor, respectively. Thus, process steps described as being performed by the "merchant" or the "vendor", may be automated steps performed by their respective computer systems. These steps are implemented within software modules (or computer programs) executed by one or more general purpose computers. For example, the web browser (or user interface) 12 may be implemented on the computer 14 using one or more software applications. Specially designed hardware could alternatively be used to perform certain operations. Process steps described as being performed by a "customer" are typically performed by a human operator via the computer 14, but could, alternatively, be performed by an automated agent.

The customer 10 may use any web-enabled or Internet applications, such as the web browser 12, or any other client-server applications or features including E-mail or other messaging techniques to communicate with (or connect to) the merchant web site 22 and/or server 24 through the communications network 18. In addition, the computer 14 may be any of a number of computing devices that are capable of communicating over the network, including but not limited to set-top boxes, personal digital assistants, mobile phones including "smart" phones, digital media players, Web pads, tablets, laptop computers, desktop computers, electronic book readers, and the like. The protocols and components for providing communication between the customer computer 14 and the merchant website 22 and/or server 24 are well known to those skilled in the art of computer communications and thus, need not be described in more detail herein.

The data and/or computer executable instructions, programs, firmware, software and the like (also referred to herein as "computer executable components") described herein may be stored on a computer-readable medium that is within or accessible by the customer computer 14 and/or the server 24, having sequences of instructions which, when executed by a processor (or CPU), cause the processor to perform all or a portion of the functions and/or methods described herein. Such computer executable instructions, programs, software and the like may be loaded into the memory of the customer computer 14 or the server 24, using a drive mechanism associated with the computer readable medium, such as a floppy drive, CD-ROM drive, DVD-ROM drive, network interface, or the like.

As used herein, the term "keyword" includes individual words or groupings of alphanumeric characters, as well as strings of multiple words or groupings of alphanumeric characters that may be separated by spaces, commas, dashes, colons, semicolons, or any other delimiter. Keywords may be used to initiate searches, such as by entering a keyword into a search engine on a browser 12, or by selecting a keyword from a list, such as an online catalog. For example, the entry or selection of the keyword "holiday" may return a different set of results than the entry or selection of the keyword "holiday movies" or "holiday gift ideas." Additionally, the term "keyword" can refer to a particular category (such as "hockey stick" or "news"), brand (such as "Starbucks"), or theme (such as "Halloween"), either specifically or generally, and may also refer to one or more particular items (such as "Nike Air Jordan shoes").

When referring to keywords and their order of selection or entry by a customer 10, the term "primary" may be used to refer to an originally selected or entered keyword, while the terms "secondary," "tertiary" and so on may be used to refer to items that are identified as having first-level and second-level relationships, respectively, to the primary keyword. Similar terms may be used to reflect the relationships between keywords, and such terms may also be compounded with upon one another. For example, a first keyword may be associated with a second keyword that is also associated with a third keyword. In such an example, the first keyword may be called a "primary keyword" to the second keyword and the third keyword, which may be called a "secondary keyword" and a "tertiary keyword," respectively. Additionally, the second keyword may be called a "primary keyword" with respect to both the first and the third keywords, which may also be deemed "secondary keywords" with respect to the second keyword.

Relationships or connections between keywords and/or items may be expressed, for example, by tethers extending between a hub and nodes, or between nodes, on a computer display. The terms "primary," "secondary," "tertiary" and so on may also refer to tethers that may depict various levels of relationships between keywords and/or items. Although many systems and methods according to the present disclosure incorporate the display of such tethers to express relationships between keywords or items, those of skill in the art will recognize that the display of tethers is not essential to the systems and methods of the present disclosure.

The systems and methods of the present invention typically begin with the selection or identification of a keyword 112 by a customer 10 using a browser 12 operating on a computer 14. The keyword 112 may be selected or identified by the customer 10 in any number of ways, such as typing into a search engine, or selecting from a menu or list. The keyword 112 may correspond to one or more items, such as goods, products, services, information or media, which may be purchased or otherwise ordered online. The keyword 112 may also correspond to a category of one or more items, or a theme, trend or timely topic of interest.

For purposes of illustration, the systems and methods described herein will be described primarily in the context of a merchant that provides functionality for users to search for items by entering a keyword into a search engine or to browse among various items in an electronic catalog. As will be recognized by those of skill in the art, however, the disclosed systems and methods may also be used in numerous other environments.

Figure 2:
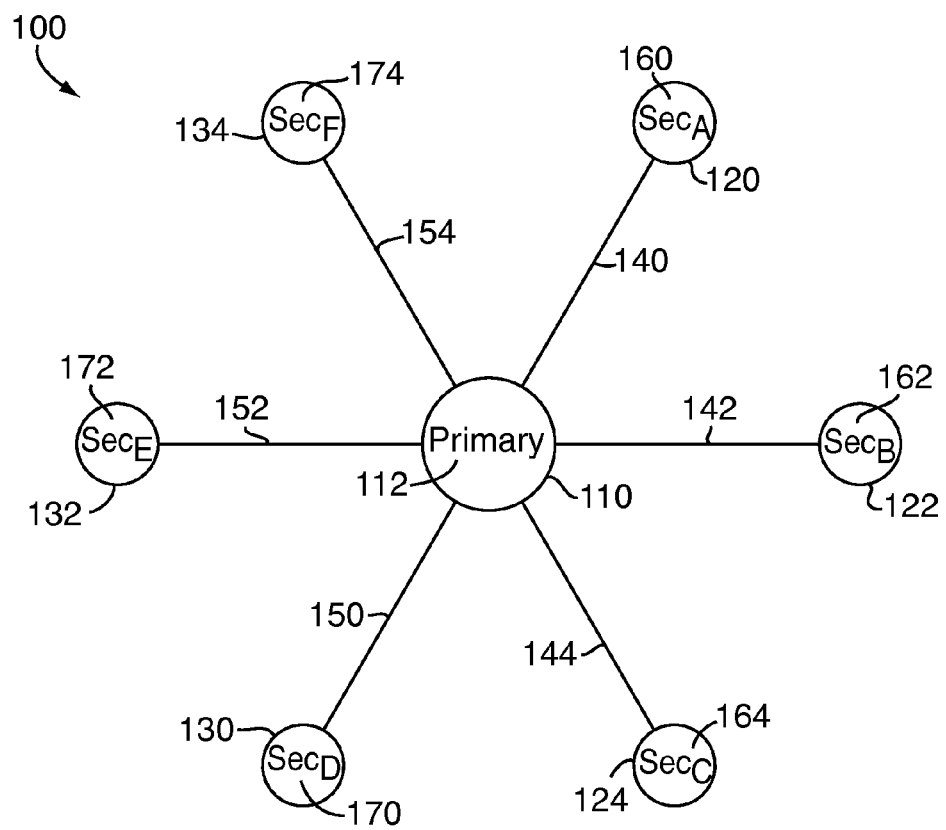
FIG. 2 is a relationship graph in accordance with embodiments of the present disclosure.

Referring to FIG. 2, a relationship graph 100 according to the present invention is shown. In FIG. 2, a hub 110 corresponding to a primary keyword 112 is displayed substantially centrally, with the primary keyword 112 positioned within the hub 110. Nodes 120, 122, 124, 130, 132, 134 are displayed around the hub 110, along with tethers 140, 142, 144, 150, 152, 154 that visually link the respective nodes to the hub 110. Secondary keywords 160, 162, 164, 170, 172, 174 corresponding to the nodes 120, 122, 124, 130, 132, 134 are shown within the nodes. Thus, the relationship graph 100 shown in FIG. 2 may be used to graphically display a relationship of a primary keyword 112, such as that which may be entered into a search engine or selected from a list, to a plurality of secondary keywords 160, 162, 164, 170, 172, 174 that may be associated with the primary keyword 112.

Figure 3:
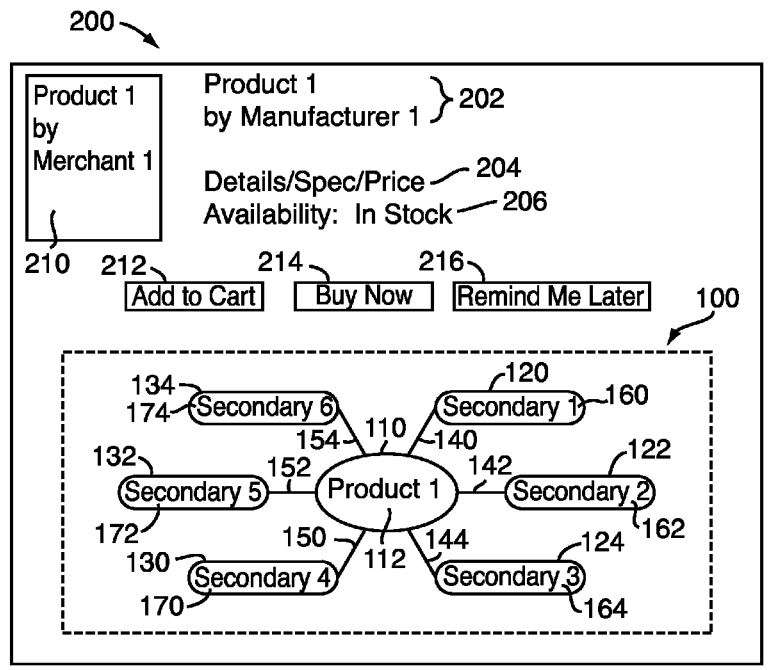
FIG. 3 is a user interface displaying a relationship graph in accordance with embodiments of the present disclosure.

The relationship graphs according to the present disclosure may stand alone as independent interfaces or may be included for use in standard commercial interfaces that may be displayed, for example, on a browser 12 operating on a computer 14. A user interface 200 including a relationship graph 100 according to an embodiment of the present disclosure is shown in FIG. 3. When a customer 10 enters a keyword 112 corresponding to a product into a search engine in a browser 12 operating on a computer 14, the user interface 200 may provide information regarding the product, such as the names of the product and its manufacturer 202, details 204 such as specifications and/or the price, and an indicator 206 as to the availability of the product, and an image 210 of the product. The user interface 200 may also provide the user with a button or link 212 for adding the product to a virtual "shopping cart," a button or link 214 for purchasing the product, and a button or link 216 for requesting that a reminder be sent regarding the product at a later date or time. Additionally, the user interface 200 may display recommended secondary items or categories of items 160, 162, 164, 170, 172, 174 to the customer 10, which may have some relationship to the product. The secondary items or categories of items shown in FIG. 3 are displayed within nodes 120, 122, 124, 130, 132, 134, which are connected to a hub 110 corresponding to the product.

Any characteristic of the hub, the nodes or the tethers of the relationship graphs of the present disclosure may be selected or modified in order to express an aspect of a relationship between keywords or items corresponding to the hub or any of the nodes. For example, the shape, the location, the color or the size of the hub, the nodes or the tethers, or the fonts of any text expressed therein, may be chosen to express a degree of relationship between keywords or items. Moreover, the hub or the nodes may be shown without a shape or icon, and may be expressed solely as text, alphanumeric characters, logos, trademarks or other indicia of a keyword or item, and tethers need not be included between the hub and any of the nodes, or between nodes.

Figure 4A:
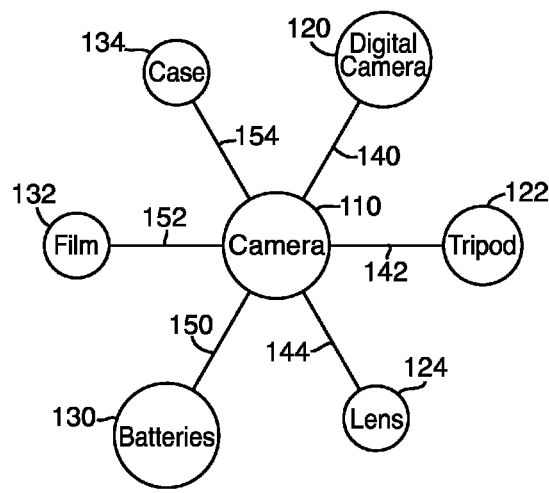
FIGS. 4A-4F are embodiments of relationship graphs in accordance with embodiments of the present disclosure.

Referring to FIGS. 4A, 4B, 4C and 4D, the systems and methods of the present disclosure may be used to identify or recommend other items or categories of items that may have only a tangential relationship to the keyword that served as the basis for the search. When the customer 10 enters the keyword "camera" into a merchant search engine operating on a browser 12, the relationship graph 100 shown in FIG. 4A is displayed on a computer display, with hub 110 representing the keyword "camera," and a first set of nodes 120, 122, 124, 130, 132, 134 representing "digital camera," "tripod," "lens," "batteries," "film" and "case," respectively, and a first set of tethers 140, 142, 144, 150, 152, 154 visually linking the respective nodes to the hub 110. The keywords represented by the nodes 120, 122, 124, 130, 132, 134 of the first set may be automatically chosen for display by the system based on their association with the keyword "camera" represented by hub 110, and represent recommended items or categories of items for consideration by the customer 10. Additionally, the systems and methods of the present disclosure may be customized by a customer 10, who may select the number of nodes to be displayed, the minimum and maximum threshold levels of degrees of association for which a node may be displayed, or the types of items or categories of items to be returned in response to a selection or identification of a keyword.

Figure 4B:
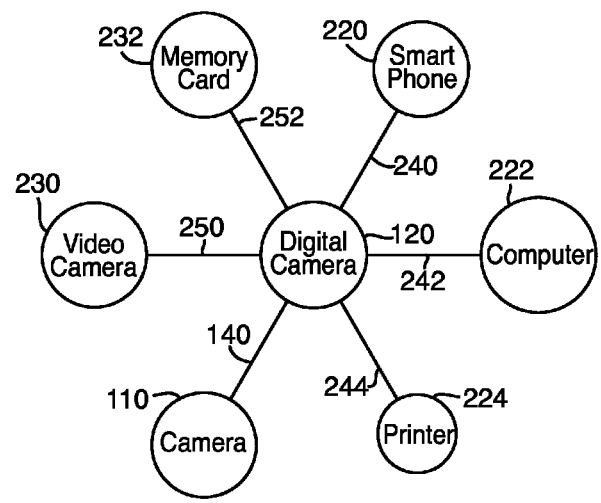

When the customer 10 selects the node 120 corresponding to the keyword "digital camera," the relationship graph 100 is modified as is shown in FIG. 4B. A second set of nodes 220, 222, 224, 230, 232 corresponding to "smart phone," "computer," "printer," "video camera" and "memory card" is displayed along with the hub 110 corresponding to "camera" around the node 120 corresponding to "digital camera," which acts as a hub to the nodes 220, 222, 224, 230, 232 of the second set and also to the hub 110 corresponding to "camera." A second set of tethers 240, 242, 244, 250, 252 linking each of the nodes 220, 222, 224, 230, 232 of the second set to node 120 is displayed, and tether 140 remains between hub 110 corresponding to "camera" and node 120 corresponding to "digital camera." Each of the keywords represented by the nodes 220, 222, 224, 230, 232 of the second set may be automatically displayed based on an association with "digital camera," and may represent items or categories of items that are related to "digital camera" and recommended for further consideration by the customer 10. Upon the selection of a node, such as the node 120 corresponding to "digital camera," the relationship graph 100 may be recentered on the selected node, such that the selected node may be moved to a centroid of the display, or to a centroid of a portion of the display.

Figure 4C:
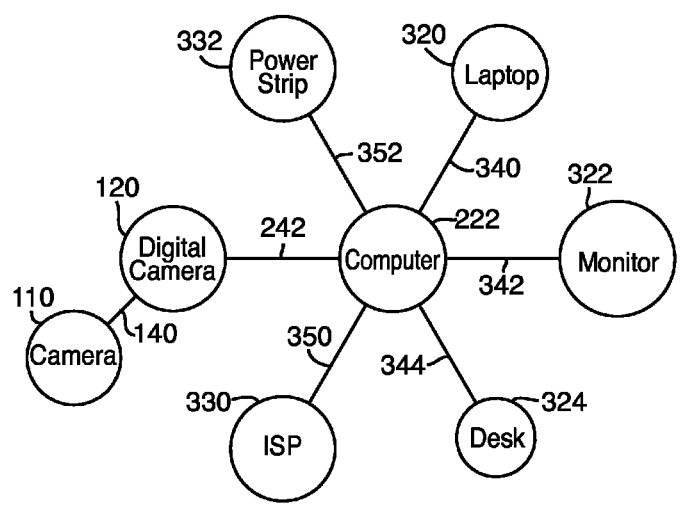

When the customer 10 selects the node 222 corresponding to the keyword "computer," the relationship graph 100 is modified further as is shown in FIG. 4C. A third set of nodes 320, 322, 324, 330, 332 corresponding to the keywords "laptop," "monitor," "desk," "ISP" (or Internet Service Provider) and "power strip," is displayed along with the node 120 corresponding to the keyword "digital camera" and the hub 110 corresponding to the keyword "camera." A third set of tethers 340, 342, 344, 350, 352 links each of the nodes 320, 322, 324, 330, 332, respectively, to the node 222 corresponding to the keyword "computer," while tether 242 remains between node 120 corresponding to the keyword "digital camera" and node 222 corresponding to the keyword "computer," and tether 140 remains between node 120 corresponding to the keyword "digital camera" and hub 110 corresponding to the keyword "camera." Each of the keywords represented by the nodes 320, 322, 324, 330, 332 of the third set may be automatically displayed based on an association with the keyword "computer," and may represent items or categories of items that are related to "computer" and recommended for further consideration by the customer 10.

Figure 4D:
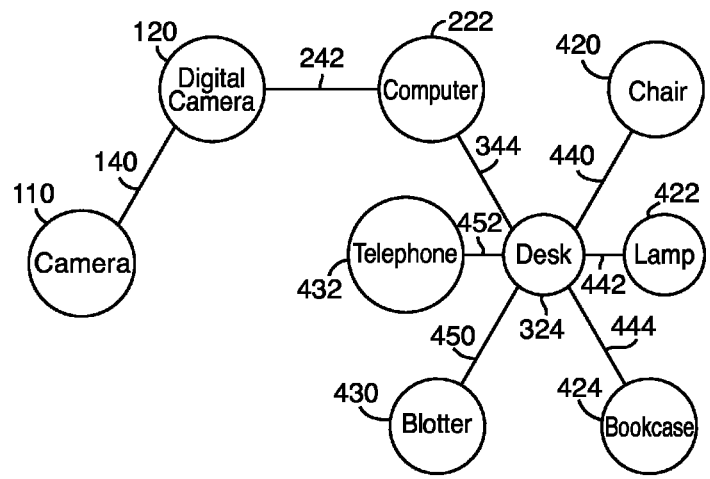

When the customer 10 selects the node 324 corresponding to the keyword "desk," the relationship graph 100 is further modified as is shown in FIG. 4D. The node 324 corresponding to the keyword "desk" acts as a hub to a fourth set of nodes 420, 422, 424, 430, 432 corresponding to "chair," "lamp," "bookcase," "blotter" and "telephone," and also to node 222 corresponding to "computer." A fourth set of tethers 440, 442, 444, 450, 452 links each of the nodes 420, 422, 424, 430, 432, respectively, while tether 344 remains between node 222 corresponding to "computer" and node 324 corresponding to "desk." Additionally, as is also shown in FIG. 4D, tether 242 remains between node 120 corresponding to "digital camera" and node 222 corresponding to "computer," and tether 140 remains between node 120 corresponding to "digital camera" and hub 110 corresponding to "camera." Each of the keywords represented by the nodes 420, 422, 424, 430, 432 of the fourth set may be automatically displayed based on an association with the keyword "desk."

The relationship graph 100 displayed in FIG. 4D includes only the hub 110 corresponding to the original keyword "camera," which served as the basis for the search, as well as the nodes 120, 222 and 324 corresponding to "digital camera," "computer" and "desk," which served as a search trail, and the nodes 420, 422, 424, 430 and 432 representing keywords associated with "desk." The remaining nodes 122, 124, 130, 132, 134, 220, 224, 230, 232, 320, 322, 330, 332, which represent keywords associated with "camera," "digital camera" and "computer" that were not selected by the customer 10, have been removed from the relationship graph 100.

Figure 4E:
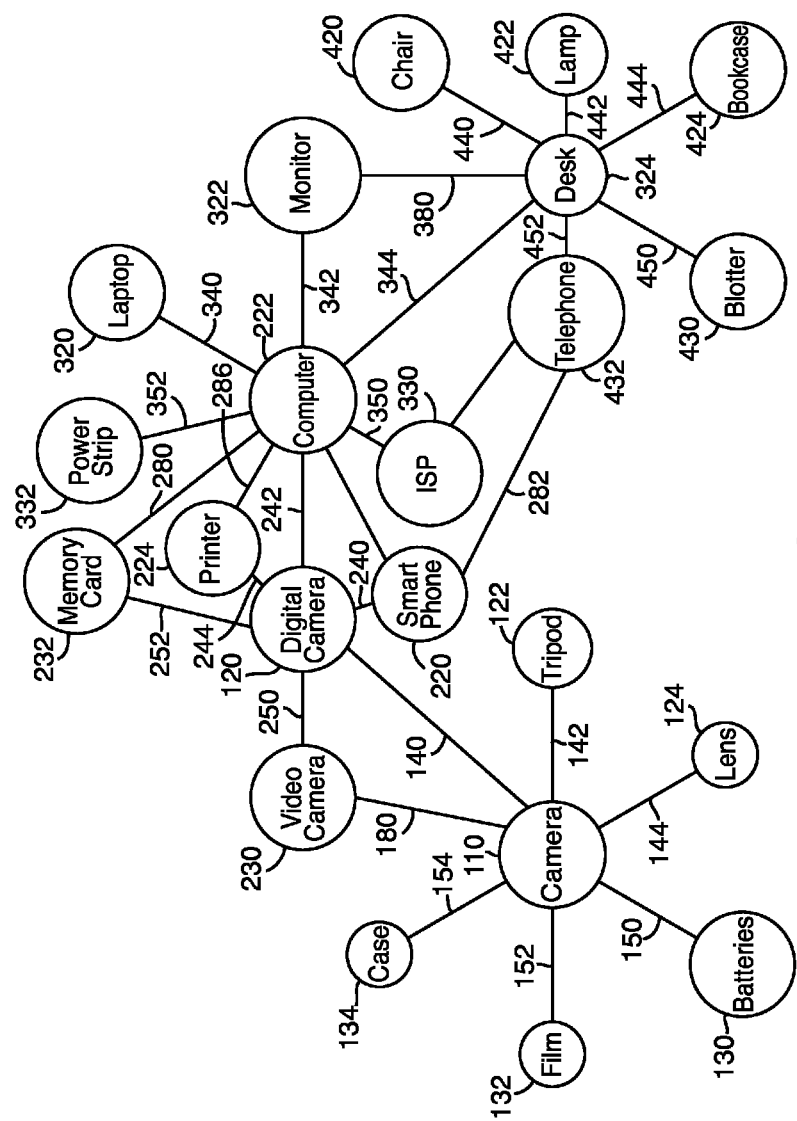

Referring to FIG. 4E, a relationship graph 100 that includes all of the nodes that were identified as associated with the keyword "camera" in FIG. 4A, the keyword "digital camera" in FIG. 4B, the keyword "computer" in FIG. 4C and the keyword "desk" in FIG. 4D is shown, along with tethers linking the nodes with the respective hub or associated node. Additionally, the relationship graph 100 shown in FIG. 4E also includes additional tethers that identify relationships between some of the nodes that were not represented in FIGS. 4A-4E. For example, tether 180 extends between the hub 110 corresponding to "camera" and the node 230 corresponding to "video camera," and identifies an association between the two keywords. Associations between the node 222 corresponding to "computer" and node 224 corresponding to "printer," node 232 corresponding to "memory card" and node 220 corresponding to "smart phone" are also identified by tethers 280, 286 and 284, respectively. Tether 282 extends between the node 220 corresponding to "smart phone" and the node 432 corresponding to "telephone" and identifies a relationship between these two keywords, as well.

Therefore, in accordance with embodiments of the present disclosure, a relationship graph may be used to recommend and display not only items or categories of items that are directly related to an original keyword or selection but also items or categories of items that may be indirectly related to the original keyword or selection. Furthermore, in accordance with embodiments of the present disclosure, items that are both directly and indirectly related to an original keyword may be presented in a simple, concise and easy-to-use format which can permit a customer 10 to smoothly navigate between the original keyword or selection and the directly or indirectly related items or categories of items. As is shown in the relationship graph 100 depicted in FIG. 4E, the entry of the keyword "camera" into a search engine results in the display of a large number of keywords corresponding to items or categories of items, each of which has a first-, second- or third-level relationship with the keyword 112 that was originally entered.

The relationship graphs of the present disclosure are flexible in nature, and may be used to enable a user to easily navigate between and among portions of the relationship graphs, and to view or consider other nodes corresponding to keywords or items that may be related to the original keyword or selection. Zooming in or zooming out on a particular portion of the relationship graph may result in the display of additional or fewer nodes corresponding to related keywords or items. According to one embodiment of the present disclosure, one way in which zooming may be effectuated is to change the minimum number of nodes to be displayed around the hub or a node, or to change the threshold degree of association between the hub and a node, or between nodes which must be met in order for a node to be displayed on the relationship graph, in response to a zoom command. For example, if a relationship graph is displayed with four nodes arranged around a hub, and a user attempts to "zoom in" on the hub, four additional nodes may be arranged around the hub. If a relationship graph is displayed with four nodes arranged around a hub, however, and a user attempts to "zoom out" on the hub, one or more of the nodes with the lowest degrees of association may be removed from the relationship graph.

Figure 4F:
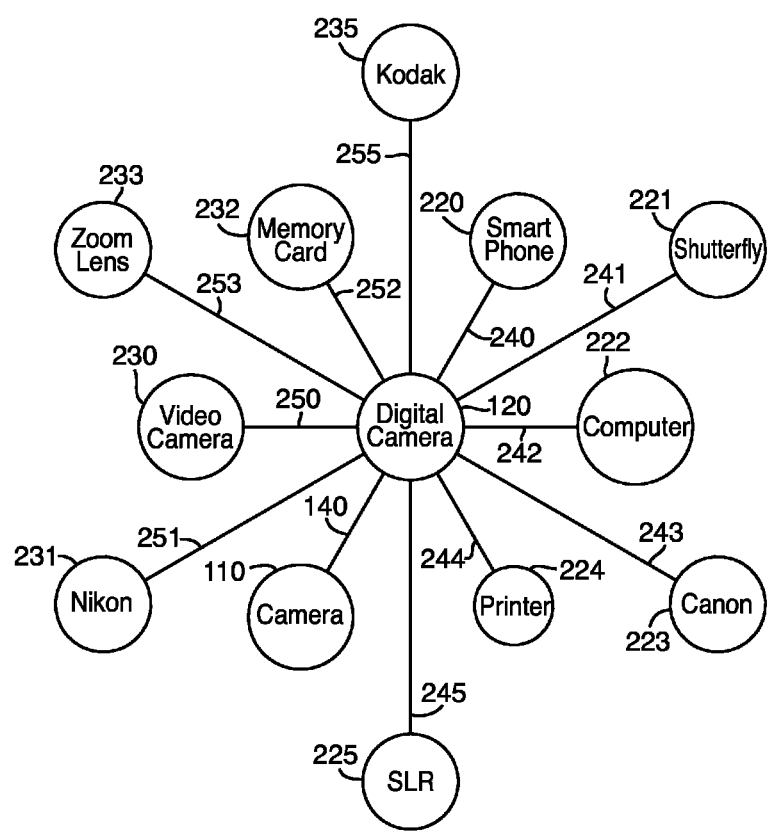

According to one embodiment of the present disclosure, zooming in on the node 120 representing "digital camera" in the relationship graph shown in FIG. 4B may result in the display of the relationship graph shown in FIG. 4F, which includes nodes 221, 223, 225, 231, 233, 235 corresponding to keywords "Shutterfly," "Canon," "SLR" (or single-lens reflex), "Nikon," "zoom lens" or "Kodak," respectively, in addition to the hub 110 and nodes 220, 222, 224, 230, 232 that are also shown in FIG. 4B. Conversely, zooming out on a particular node, such as the node 120 representing "digital camera" in FIG. 4F, may result in the display of the relationship graph shown in FIG. 4B, and the removal of certain nodes corresponding to certain related keywords or items. The nodes which may be added or removed when zooming in or zooming out on a relationship graph may be selected based on a degree of association between the node or area of the relationship graph subject to the zoom, and between additional keywords or items represented by the nodes to be added or removed, or other criteria, such as the desired number of nodes to be displayed following a zooming in or a zooming out.

Users may also pan the relationship graph in any direction on the display. A relationship graph may be panned when a user selects the hub, a node or any portion of the relationship graph and transitions or otherwise provides a gesture to the graph along a vector, such that the hub, nodes and/or tethers of a relationship graph move in parallel to new positions on the display consistent with the vector. For example, selecting a portion of the relationship graph shown in FIG. 4A and panning the graph, such as by clicking and "dragging" the graph to the left, may result in the display of the relationship graphs shown in FIG. 4D or 4E. Panning or "dragging" a relationship graph may also reveal or conceal nodes corresponding to related keywords or items, which may either expose the user to additional keywords or items which were not originally displayed on the display, or narrow the user's focus to a set of keywords or items that is smaller than that which was originally displayed.

Users may also recenter the relationship graph on the hub, on any node, or on any portion of the relationship graph. For example, users may select a portion of the relationship graph, and the selected portion may be manually or automatically moved to a centroid of the computer display, or to a centroid of a portion of the computer display, such as by "double-clicking" a node, or by any other known system or method for selection.

Any known or existing system or method for manipulating user interfaces, such as a keyboard, keypad, mouse, stylus, touch screen or other device, may be utilized to issue a zoom command, to pan or to recenter the relationship graphs of the present disclosure on a display, such as a keyboard, keypad, mouse, stylist, touch screen, or other device. For example, the relationship graphs may be manipulated by clicking or selecting standard overlay tools, such as arrows or throttles, which may be located on a user interface. As another example, a keyboard, mouse, touch screen or other device may be used to provide a gesture, a tap, an input, a "dragging" or another dimensional motion from a user consistent with the gesture provided by the user, and the relationship graph may be repositioned accordingly. In yet another example, a user may select a first location on a display and subsequently select a second location on the display. The portion of the relationship at the first location may be repositioned to the second location, and one or more of the hub, the nodes and/or the tethers may be repositioned concomitantly by a distance equal to that between the first location and the second location, or in a direction parallel to a line extending between the first location and the second location.

The embodiments of the present disclosure are not limited to depicting the relationships of physical items, such as goods. As is set forth above, the term "item" may include goods as well as services, information, media, real estate or any other product or thing that may be reviewed by a customer 10 using a computer 14. For example, the entry or selection of the keyword "Florida" may result in the display of a hub corresponding to "Florida" and nodes corresponding to "oranges," "sugarcane," "fishing excursions" or "the Daytona 500," as well as "airfare to Miami," "hotels in Orlando," "car rentals in Key West," or "discount Florida automobile insurance rates," which may be recommended for review and consideration by the customer 10.

Figure 5:
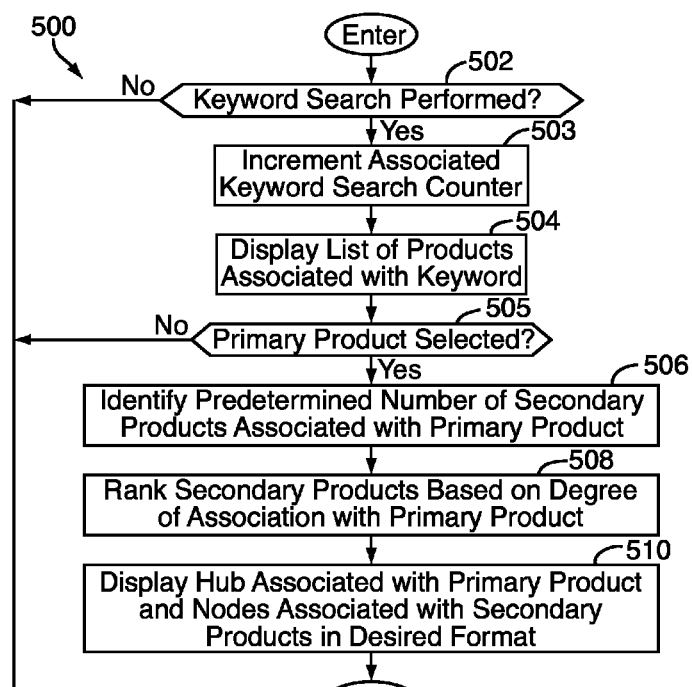
FIG. 5 is a flow chart of a method for displaying a relationship graph in accordance with an embodiment of the present disclosure.

Referring to FIG. 5, a flow chart 500 illustrates one embodiment of a process for displaying a relationship graph and recommending secondary products that are related to a primary product according to a system and method of the present invention is shown. The process begins at step 502, where it is determined whether a keyword search has been performed. If a search has not been performed, the process ends. If a search has been performed, then at step 503, a counter of searches pertaining to the keyword is incremented accordingly, and at step 504, a list of products pertaining to the keyword is displayed. At step 505, it is determined whether a primary product has been selected from the list of products. If a primary product has been selected from the list of products, then at step 506, a predetermined number of secondary products associated with the primary product are identified. At step 508, the secondary products are ranked based on their respective degrees of association with the primary product, and at step 510, a hub associated with the primary product and nodes associated with the secondary product are displayed in a desired format, which may include the display of tethers extending between the hub and each of the nodes.

Although the flow chart 500 shown in FIG. 5 pertains to a keyword search followed by the selection of a primary product from the results of that search, and the subsequent display of a relationship graph including a hub associated with the primary product and nodes associated with a predetermined number of secondary products, the process depicted in flow chart 500 may be modified as necessary to reflect other forms of relationship graphs. For example, similar methods according to other embodiments of the present disclosure may begin with the browsing of an electronic catalog and the selection of an item or a category from a list, and result in the subsequent display of a relationship graph including a hub and one or more nodes relating to the selected item or category. Furthermore, other methods according to embodiments of the present disclosure may display a relationship graph immediately following the entry of a keyword without requiring that a primary item be selected, such that the displayed relationship graph 100 includes a hub corresponding directly to the keyword and nodes corresponding to items or categories of items related to the keyword. Moreover, the flow chart 500 shown in FIG. 5 and other methods of the present disclosure may begin with the identification or selection of a keyword by any standard means.

The systems and methods of the present disclosure may identify secondary keywords that are related to a primary keyword in any number of ways. For example, the teachings of Linden, which describe performing item-to-item mappings to correlate known interests of users in particular items at regular intervals and using such mappings to generate recommendations for a given user, may be particularly helpful in identifying relationships between a primary keyword and related secondary keywords. Any means or method for identifying secondary keywords associated with a primary keyword may be utilized in accordance with the teachings of the present invention.

The systems and methods of the present disclosure may also be used to determine degrees of association between a primary keyword and related secondary keywords in any number of ways, such as logically, qualitatively, heuristically or quantitatively, and may be used as the basis for displaying hubs, nodes and tethers in a relationship graph 100, or to recommend related items or categories of items to a customer 10. One way to determine one or more degrees of association between a keyword or selection and related items or categories of items is to count a number of "countable events" associated with an original keyword or selection and an item or category of item. The term "countable event" may be indicative of the quantity of occurrences of an event associated with an item or category of item and an original keyword or selection, and the number or frequency of countable events may be used to determine the relevance of the particular product to the original keyword or selection.

For example, a quantitative degree of association may be determined by counting a quantity of countable events associated with a primary keyword and a particular secondary keyword, and comparing that quantity to all of the countable events associated with the primary keyword for a set of secondary keywords. A degree of association with the primary keyword for any particular secondary keyword may be calculated according to equation (1), below:

$$A_{PS_i} = \frac{Q_{PS_i}}{\sum_{i=1}^{n} Q_{PS_i}} \quad (1)$$

wherein P is a primary keyword, $S_i$ is a secondary keyword associated with the primary keyword, n is a predetermined number of secondary keyword, $A_{PS_i}$ is the degree of association between the primary keyword P and the secondary keyword $S_i$, $Q_{PS_i}$ is a quantity related to a countable event associated with the primary keyword P and the at least one secondary keyword $S_i$ during a predetermined period of time, and $\Sigma Q_{PS_i}$ is the sum of the quantities related to the countable event associated with the primary keyword P and the secondary keywords $S_i$ through $S_n$.

Degrees of association calculated according to equation (1) set forth above will have values between zero and one. For example, if a primary keyword P is associated with three secondary keywords $S_1$, $S_2$, $S_3$, and there are four countable events associated with P and $S_1$, three countable events associated with P and $S_2$, and two countable events associated with P and $S_3$, then the degree of association $A_{PS1}$ equals 4/9, or 0.444, the degree of association $A_{PS2}$ equals 3/9, or 0.333, and the degree of association $A_{PS3}$ equals 2/9, or 0.222. The degrees of association calculated according to equation (1) may be used to determine the display and placement of nodes and tethers corresponding to secondary keywords $S_1$, $S_2$, $S_3$, for example.

The number of times that a particular product is sold, ordered, reviewed, added to shopping carts or otherwise associated with an event based on an original keyword or selection may be counted and used to determine a degree of association for the particular product to the original keyword or selection.

As those of skill in the art will recognize, any countable event may be used to determine a quantitative degree of association between a primary keyword P and one or more secondary keywords $S_i$, in accordance with equation (1), above. Moreover, a degree of association may be determined based on the known interests and characteristics of the particular customer 10, or of other similarly situated customers, and nodes and tethers corresponding to related secondary keywords may be displayed as associated with a hub corresponding to a primary keyword based on the respective degrees of association between the primary and secondary keywords.

Degrees of association may be determined by comparing the interests of a particular customer 10 with the interests of other customers. For example, Linden teaches the mappings of items to similar items ("item-to-item mappings") periodically, such as once per week, by an off-line process which identifies correlations between known interests of users in particular items. The mappings performed in Linden are generating by periodically analyzing user purchasing and viewing histories to identify correlations between purchases of items, wherein the similarity between two items is preferably measured by determining the number of users that have an interest in both items relative to the number of users that have an interest in either item (e.g., items A and B are highly similar because a relatively large portion of the users that bought one of the items also bought the other item), and may also incorporate other types of similarities, including content-based similarities extracted by analyzing item descriptions or content. To generate a set of recommendations for a given user, Linden teaches retrieving lists corresponding to items already known to be of interest to the user, and combining the lists to generate a list of recommended items. The similar items lists may be appropriately weighted, prior to being combined, based on any indicia of a user's affinity for, or current interest in, corresponding items of known interest, thereby increasing the likelihood that the items in that list will be included in the recommendations that are ultimately presented to the user. Furthermore, the item-to-item mappings are regenerated periodically based on up-to-date sales data, and are performed online. Therefore, the recommendations tend to reflect the current buying trends of the community and can be generated rapidly and efficiently (such as in real-time in response to a request by the user), without sacrificing breadth of analysis.

If an item or category of items is known to be frequently viewed or purchased by other customers who enter or select a particular keyword, then that particular item or category of items may be determined to have a high degree of association with that keyword, and may be preferentially displayed accordingly when the keyword is entered or selected by a customer 10. For example, if it is known that other customers who enter or select the keyword "baby" tend to have an interest in categories of items such as strollers, cribs, children's clothing, diapers and car seats, then nodes corresponding to each of these categories of items may be displayed when customer 10 enters or selects the keyword "baby." If it is known that customers who enter or select a particular keyword tend to purchase particular individual items, then nodes corresponding to those particular items may be displayed in response to the entry or selection of that particular keyword. For example, if users who enter or select the keyword "grill" are known to view or purchase a particular brand or model of grill, charcoal, spatula or basting brush, then nodes corresponding to those particular brands may be displayed around a hub corresponding to the keyword "grill" upon the entry or selection of that keyword by customer 10.

Degrees of association may also be determined based on the known characteristics and tastes of the particular customer, which may be recorded or otherwise maintained in a user profile. For example, if a particular customer 10 is known to prefer history or food versus art or sports, based on his or her prior viewing or purchasing habits, then the entry or selection of the keyword "New York" may result in the display of nodes corresponding to the Statue of Liberty or Little Italy, and not the Metropolitan Museum of Art or Yankee Stadium. If a particular customer 10 is known to be a sports fan who prefers to purchase sports memorabilia but not tickets to sporting events, based on his or her prior viewing or purchasing habits, then the entry or selection of the keyword "Boston" could result in the display of nodes corresponding to a Boston Red Sox baseball cap or a basketball autographed by a member of the Boston Celtics, but would not result in the display of a node corresponding to tickets to a Boston Bruins hockey game. If a particular customer 10 is known to prefer the colors blue and white for general purchases, and is known to dislike the colors maroon and gold, then items that are blue- or white-colored may be preferentially represented in nodes, while items that are maroon- or gold-colored may be preferentially ignored.

Degrees of association may also be determined based on subjective criteria relating either to a particular customer, or to the selection or entry of a keyword or item by the particular customer, and may be further customized or weighted for any reason, such as the time of year that the selection was made, or the age or location of the customer 10 when a keyword is entered or selected. For example, the entry or selection of the keyword "Brady" during the spring and summer months may result in the display of nodes corresponding to "The Brady Bunch," "Florence Henderson" or "the 1970s," while the entry or selection of the keyword "Brady" during the fall and winter months of football season may result in the display of nodes corresponding to "Tom Brady," "New England Patriots" or "quarterback." Additionally, upon the entry or selection of the keyword "Portland" by a customer 10 located in the Pacific Northwest, the systems and methods according to the present disclosure may be encoded to display a set of nodes relating to the city of Portland, Oreg., while the entry or selection of the keyword "Portland" by a customer 10 located in New England may result in the display of a different set of nodes relating to the city of Portland, Me. Finally, the entry or selection of the keyword "Eric Clapton" by a customer 10 who is known to be in his or her fifties may result in the display of nodes corresponding to "Cream" or "Derek and the Dominoes," which were popular bands in which Eric Clapton played in the 1960s and 1970s, while the entry or selection of the keyword "Eric Clapton" by a customer 10 who is in his or her thirties may result in the display of nodes corresponding to "Unplugged" or "Tears in Heaven," which were a popular album and song, respectively, released by Eric Clapton in the 1990s.

The systems and methods according to the present disclosure may also be modified to reflect temporal degrees of association between a keyword and other related keywords or categories of items for a period of time of any duration. In such a manner, items or categories of items that are particularly popular for a given period of time may be selectively displayed in response to the entry or selection of a particular keyword. For example, a customer 10 interested in identifying items, such as books, pertaining to theology may enter the keyword "theology" into a search engine, and nodes corresponding to "the Bible" and "Harry Potter" may be displayed around a hub corresponding to "theology." While the Bible is perhaps the most frequently sold book in history, the books of the Harry Potter series are typically among the best sellers around the world, and have greatly exceeded sales of the Bible in recent times. Therefore, if the systems and methods according to the present disclosure are encoded to represent historical relationships on a long-term basis, a relationship graph may express a degree of association between the keywords "theology" and "the Bible" that is greater than a degree of association between the keywords "theology" and "Harry Potter." If the systems and methods according to the present disclosure are encoded to represent historical relationships on a short-term basis, however, a relationship graph may express a degree of association between the keywords "theology" and "the Bible," that is less than a degree of association between the keywords "theology" and "Harry Potter."

A short-term degree of association between a keyword or item and one or more items or categories of items may be determined by comparing a quantity of countable events over a fixed, relatively short and recent period of time. In the example set forth above, a short-term degree of association between the keyword "theology" and the categories "the Bible" and "Harry Potter" may be determined by counting the sales of the Bible and books of the Harry Potter series in a particular calendar year, for example. A long-term degree of association between a keyword or item and one or more items or categories of items may be determined by comparing a quantity of countable events over a longer period of time.

The architecture of embodiments of the relationship graphs according to the present disclosure may be utilized to reflect the relationships between a keyword and one or more related keywords, including the degrees of association between the primary and secondary keywords, in several ways. For example, any characteristic of the hub or of any of the nodes or tethers of a relationship graph 100, including the colors, dimensions, shapes, arrangement and/or location of the hub, any of the nodes or any of the tethers, if applicable, may be selected or otherwise varied in order to reflect an association or relationship between the keyword and related keywords.

According to the systems and methods of the present disclosure, the degrees of association between a primary keyword and one or more secondary keywords may be represented by variations in the arrangement of nodes and tethers extending radially outward from a hub. For example, the node corresponding to an item or category of items having the highest degree of association with a keyword or other item may be radially isolated from the nodes corresponding to other items or categories of items. Referring to FIG. 6A, a hub 110 corresponding to a primary keyword and six nodes 120, 122, 124, 130, 132, 134 corresponding to secondary keywords are shown, and node 120 is shown to be radially isolated from nodes 122, 124, 130, 132, 134. In another example, the node corresponding to a secondary keyword having the highest degree of association with a primary keyword may be oriented in a prime position with respect the hub corresponding to the primary keyword. Referring to FIG. 6B, node 120 is shown to be positioned vertically above hub 110, i.e., in the "twelve o'clock" position above the hub, and above all of the other nodes 122, 124, 130, 132, 134 which are shown to be positioned at lower elevations below node 120.

Figure 6D:
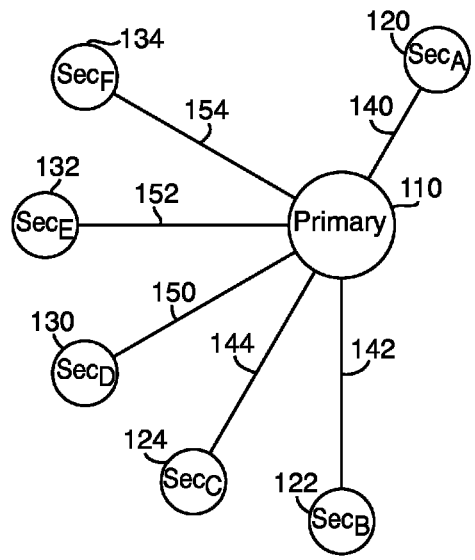

The degrees of association between a primary keyword and one or more secondary keywords may also be represented by varying the lengths of the tethers that connect respective nodes to the hub or to other nodes. Referring to FIG. 6C, tether 140 connecting node 120 to hub 110 is shown to be longer than tethers 142, 144, 150, 152, 154. Referring to FIG. 6D, tether 140 connecting node 120 to hub 110 is shown to be shorter than tethers 142, 144, 150, 152, 154. Either of these embodiments of the present disclosure may indicate that node 120 has the highest degree of association with hub 110, or that node 120 has the lowest degree of association with hub 110. In the particular example of FIG. 6C, node 120 may be shown to "stand out" from nodes 122, 124, 130, 132, 134, based on the long length of tether 140. In the particular example of FIG. 6D, node 120 may be placed to show a close relational proximity to node 110, based on the short length of tether 140.

Figure 6E:
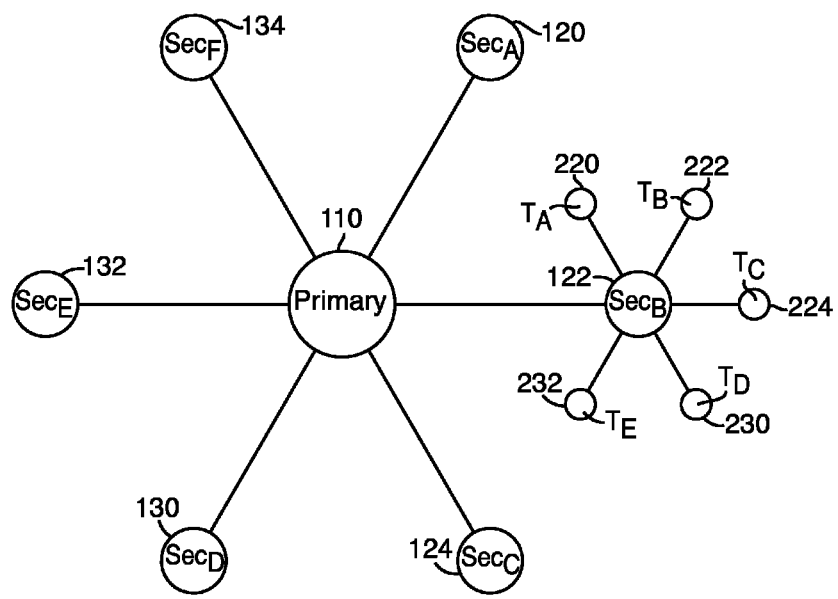

The relationship graphs according to the present disclosure may also be used to show multiple levels of association between a hub corresponding to a primary keyword or item and nodes corresponding to other keywords or items. Referring to FIG. 6E, nodes 120, 122, 124, 130, 132, 134 are shown as being linked to hub 110, and nodes 220, 222, 224, 230, 232 are shown as being linked to node 122. In such a way, the relationship graph shown in FIG. 6E exposes a customer 10 to eleven items or categories of items related to the keyword represented by hub 110, including a first-level association between hub 110 and nodes 120, 122, 124, 130, 132 134, and a second-level association between hub 110 and nodes 220, 222, 224, 230, 232. Any number of levels of association may be expressed in such a manner, limited only by the space made available for displaying the relationship graph 100.

Degrees of association may also be expressed in a relationship graph according to the present disclosure by varying the sizes, shapes or other dimensions of the hub, nodes and tethers. For example, the size of the node may indicate the degree of association between the keyword associated with that node and the keyword associated with the hub. Referring to FIG. 6F, node 122 is shown as being larger than any of nodes 120, 124, 130, 132, 134, thereby indicating that the secondary keyword represented by node 122 has a greater degree of association with the primary keyword represented by hub 110 than that of any of the other secondary keywords represented by nodes 120, 124, 130, 132, 134. Referring to FIG. 6G, the shapes of the nodes 120, 122, 124, 130, 132, 134 correspond to wedges which represent portions of a pie graph, the sizes of which indicate the degree of association between the secondary keywords represented by the nodes and the primary keyword represented by the hub 110.

Referring to FIG. 6H, the tethers 140, 142, 144, 150, 152, 154 connecting nodes 120, 122, 124, 130, 132, 134 to hub 110 have varying thicknesses, wherein tether 140 is the thickest tether, followed in descending order of thickness by tether 150 and tether 154. The thickness of tether 142 may indicate that the secondary keyword represented by node 122 has the highest degree of association with the primary keyword associated with hub 110, while the thickness of tether 150 may indicate that the secondary keyword represented by node 130 has the second-highest degree of association with the primary keyword associated with hub 110, and so on.

Figure 6J:
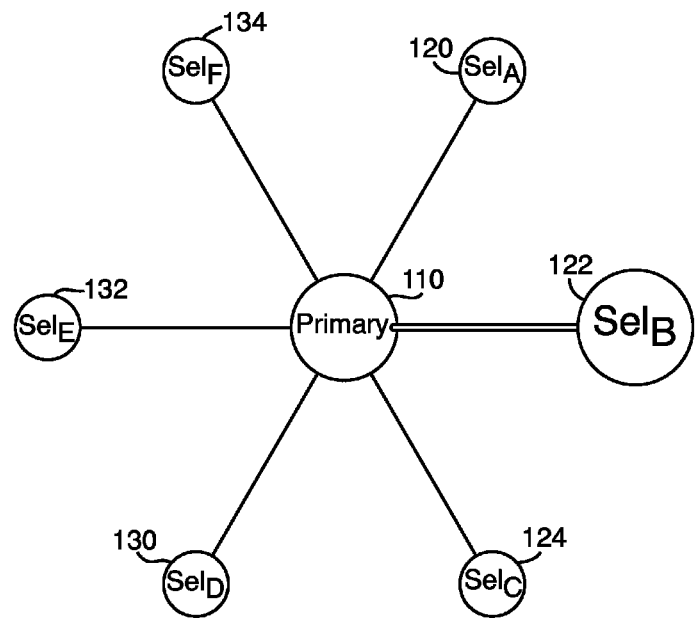

Similarly, referring to FIG. 6I, the tethers 140, 142, 144, 150, 152, 154 linking nodes 120, 122, 124, 130, 132, 134 to hub 110 have varying widths and fan radially outward from hub 110, which may be based on degrees of association between the secondary keywords represented by the nodes 120, 122, 124, 130, 132, 134 and hub 110. For example, it may be inferred that the secondary keyword associated with node 122 has the highest degree of association with the primary keyword associated with hub 110, and that the secondary keyword associated with node 134 has the second-highest degree of association with the primary keyword associated with hub 110, based on the shapes of tethers 142, 154. Additionally, nodes may be displayed about the hub 110 in a three-dimensional (3D) or simulated 3D format that uses the positions of the nodes with respect to the hub 110 within the graph to indicate a degree of association. Referring to FIG. 6J, node 122 and tether 142 are shown as extending forward from the page, suggesting that node 122 has the highest degree of association with the primary keyword associated with hub 110.

Figure 6K:
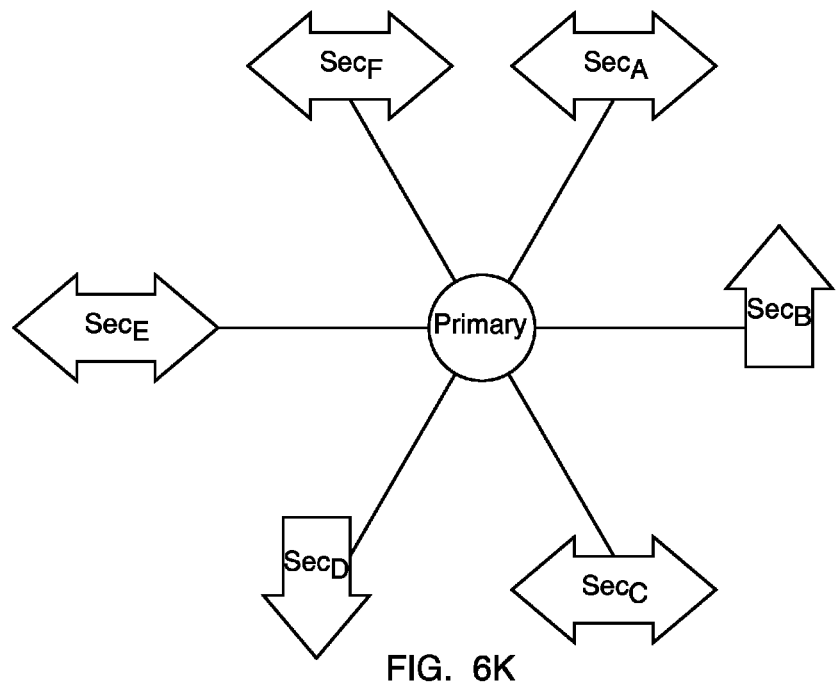

The shapes of the hub, nodes and tethers may also be used to depict short-term popularity or trends in the relationships between a primary keyword and one or more secondary keywords. Referring to FIG. 6K, nodes 120, 124 and 134 are shown as side-to-side arrows, while node 122 is shown as an upwardly pointing arrow and node 130 is shown as a downwardly pointing arrow. As such, it may be shown that the secondary keywords associated with nodes 120, 124 and 134 have a substantially constant degree of association with the keyword represented by hub 110, while the secondary keyword associated with node 130 has a decreasing degree of association with the keyword represented by hub 110 and the secondary keyword associated with node 122 has an increasing degree of association with the keyword represented by hub 110. In such a manner, a customer 10 may learn which of the secondary keywords represented in the relationship graph 100 may be increasing or decreasing in their popularity, or in their degree of association with the keyword represented by hub 110.

Any other shapes, icons, logos or other expressions for showing relative changes in status, number or degree of association may be used. For example, tethers connecting nodes associated with secondary keywords that have increasing degrees of association with the primary keyword may be shown as upwardly pointing arrows, and tethers associated with secondary keywords having decreasing degrees of association with the primary keyword may be shown as downwardly pointing arrows.

Colors of the hub, nodes or tethers may also be varied in such a way that expresses a relationship, or a degree of association, between a primary item and one or more secondary items. For example, a node or a tether may be colored red to indicate that the keyword associated with the node is increasing in popularity or degree of association, or is "hot," while a node or a tether may be colored blue to indicate that the keyword associated with the node is decreasing in popularity or degree of association, or is "cold." Additionally, the nodes or the tethers may be colored to indicate different types of items or categories of items (for example, a nodes or tethers corresponding to goods may be colored green, while nodes or tethers corresponding to services may be colored blue, and nodes or tethers corresponding to media such as music or videos may be colored red), or to indicate different categories of items.

Furthermore, the colors of the hub, nodes or tethers may also be varied to represent any aspect of the relationships between keywords, such as that between a primary keyword and other keywords. For example, referring to FIG. 4E, the nodes 120, 122, 124, 130, 132, 134 and the tethers 140, 142, 144, 150, 152, 154 linked directly to the hub 110 may be shown in a first color, to express a first-level relationship between the keywords represented by those nodes and the keyword represented by the hub 110. The nodes 220, 222, 224, 230, 232 and the tethers 240, 242, 244, 250, 252 linked to node 120 may be shown in a second color, to express a second-level relationship between the keywords represented by those nodes and the keyword represented by the hub 110. Similarly, the nodes 320, 322, 324, 330, 332 and the tethers 340, 342, 344, 350, 352 linked to node 222 may be shown in a third color, and the nodes 420, 422, 424, 430, 432 and the tethers 440, 442, 444, 450, 452 linked to node 324 may be shown in a fourth color, to express third- and fourth-level relationships between the keywords represented by those nodes and the keyword represented by the hub 110. Moreover, tethers 180, 280, 282, 284 may be shown in a fifth color.

Other aspects or visual effects may be utilized to express features of the association or relationship between a primary keyword item or and other keywords or items. For example, the display of a hub, a node and/or tether may flash or otherwise be animated within a relationship graph to indicate some feature or characteristic of the association or relationship between the primary keyword or item and a secondary keyword or item.

The systems and methods of the present disclosure may also be customized as desired by the customer 10 to determine the number, type and degree of association of the nodes displayed. For example, the number of nodes displayed around a hub or another node may be specified or limited by the customer (i.e., "three" or "not more than ten"). Additionally, upon the entry of a primary keyword, the systems and methods disclosed herein to display nodes that correspond only to keywords which have degrees of association that are above or below maximum or minimum thresholds, respectively, with the primary keyword. Moreover, the customer 10 may request to receive nodes corresponding to keywords representing one or more specific themes, brands, trends, topics, or categories of items, such as goods, services, information, media or any other things of commercial interest.

The systems and methods of the present disclosure provide a simple and effective method for graphically representing the relationships between an original keyword or search term and related items or categories of items, in order to expose a user to one or more items related to the original keyword or search term. Moreover, the systems and methods disclosed herein also provide a flexible graph depicting the relationships between multiple items, including degrees of association between those items, in order to depict a relational proximity between an original keyword or search term and other items or categories of items. In this manner, the systems and methods of the present disclosure may be used to recommend items, such as goods or services, to a user based on his or her search preferences or search history, other users' preferences or search histories, or any other factors.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A non-transitory computer-readable medium having a computer-executable component for causing a computer system to perform a method for expressing relationships between items, comprising:
    receiving an identification of a primary item;
    determining a first degree of association between the primary item and each of a plurality of secondary items;
    causing a display of a hub associated with the primary item;
    causing a display of a plurality of primary nodes, wherein each of the primary nodes corresponds to one of the plurality of secondary items; and
    causing a display of a plurality of primary tethers, wherein each of the primary tethers extends between the hub and one of the plurality of primary nodes,
    receiving a selection of a primary node corresponding to a secondary item;
    determining, for each of the secondary items, a quantity related to a countable event associated with the primary item and each of the secondary items, wherein the countable event is an order of the secondary item following the identification of the primary item;
    determining a second degree of association between the secondary item associated with the selected primary node and each of a plurality of tertiary items, wherein the second degree of association is determined based at least in part on the quantity determined for each of the secondary items;
    causing a display of a plurality of secondary nodes, wherein each of the secondary nodes corresponds to one of the plurality of tertiary items; and
    causing a display of a plurality of secondary tethers, wherein each of the secondary tethers extends between the selected primary node and one of the plurality of secondary nodes.

2. The non-transitory computer-readable medium according to claim 1, wherein at least one of a position, a dimension, a color or a shape of at least one of the plurality of primary nodes on the computer display is based at least in part on the first degree of association between the primary item and the at least one of the plurality of secondary items corresponding to the at least one of the primary nodes.

3. The non-transitory computer-readable medium according to claim 1, wherein the method further comprises:
    receiving a gesture; and
    repositioning at least one of the hub, one of the primary nodes or one of the secondary nodes graph upon the receipt of the gesture.

4. A computer-implemented method comprising:
    causing a display of a hub associated with a primary item on at least one computer display;
    causing a display of a first plurality of nodes on the at least one computer display;
    receiving a selection of a first position on the computer display; and
    repositioning at least one of the hub or one of the first plurality of nodes in response to the selection of the first position,
    wherein each of the first plurality of nodes is associated with at least one secondary item,
    wherein a characteristic of each of the first plurality of nodes on the at least one computer display is determined based at least in part on a degree of association between the primary item and the at least one secondary item associated with each of the first plurality of nodes, and wherein the repositioning comprises moving at least one of the hub or one of the first plurality of nodes in a direction parallel to a line extending between the first position and a predetermined second position on the computer display, and in a distance equal to the distance between the first position and the predetermined second position on the computer display.

5. The method according to claim 4, further comprising:
receiving a selection of one of the first plurality of nodes; and
causing a display of a second plurality of nodes on the at least one computer display,
wherein each of the second plurality of nodes is associated with at least one tertiary item, and
wherein a characteristic of each of the second plurality of nodes on the at least one computer display is determined based at least in part on a degree of association between the secondary item associated with the selected node and the at least one tertiary item associated with each of the second plurality of nodes.

6. The method according to claim 4, further comprising causing a display of a first plurality of tethers on the at least one computer display,
wherein each of the first plurality of tethers links the hub to one of the first plurality of nodes.

7. The method according to claim 5, further comprising:
causing a display of a first plurality of tethers on the at least one computer display; and
causing a display of a second plurality of tethers on the at least one computer display,
wherein each of the first plurality of tethers links the hub to one of the first plurality of nodes, and
wherein each of the second plurality of tethers links the selected one of the first plurality of nodes to one of the second plurality of nodes.

8. The method according to claim 4, further comprising determining, for each of the secondary items, a quantity related to a countable event associated with the primary item and each of the secondary items,
wherein the degree of association between the primary item and each of the secondary items is determined based at least in part on the quantity determined for each of the secondary items.

9. The method according to claim 4, wherein the node associated with the secondary item having a greatest degree of association with the primary item is a nearest node to the hub on the computer display.

10. The method according to claim 6, wherein the tether linking the hub to the node associated with the secondary item having a greatest degree of association with the primary item is a shortest tether on the computer display.

11. The method according to claim 4, wherein a dimension of each of the first plurality of nodes is selected based at least in part on the degree of association between the primary item and the secondary item corresponding to each of the first plurality of nodes.

12. The method according to claim 11, wherein the node associated with the secondary item having the greatest degree of association with the primary item is the largest node on the computer display.

13. The method according to claim 6, wherein a dimension of each of the first plurality of tethers is selected based at least in part on the degree of association between the primary item and secondary item corresponding to the node connected to the hub by each of the first plurality of tethers.

14. The method according to claim 4, wherein the receiving the selection of a first position on the computer display comprises receiving at least one of a direction or a distance.

15. The method according to claim 4, wherein the step of receiving the selection of a first position on the computer display comprises receiving a direction, and
wherein the repositioning comprises moving at least one of the hub or one of the first plurality of nodes parallel to the direction.

16. The method according to claim 4, wherein the receiving the selection of a first position on the computer display comprises receiving a distance, and
wherein the repositioning comprises moving at least one of the hub or one of the first plurality of nodes by the distance on the display.

17. The method according to claim 4, wherein the predetermined second position on the computer display is a centroid of at least a portion of the computer display.

18. A computer-implemented method comprising:
causing a display of a hub associated with a primary item on at least one computer display; and
causing a display of a first plurality of nodes on the at least one computer display,
receiving a zoom command;
causing a display of a second plurality of nodes on the at least one computer display in response to the zoom command; and
removing at least one of the first plurality of nodes from the display in response to the zoom command,
wherein each of the first plurality of nodes is associated with at least one secondary item,
wherein each of the second plurality of nodes is associated with at least one secondary item,
wherein a characteristic of each of the first plurality of nodes on the at least one computer display is determined based on a degree of association between the primary item and the at least one secondary item associated with each of the first plurality of nodes, and
wherein the at least one of the first plurality of nodes to be removed is selected based on a degree of association between the primary item and the at least one secondary item associated with the at least one of the first plurality of nodes to be removed.

19. A computer-implemented method comprising:
receiving a selection of a primary keyword by a customer;
causing a display of a hub associated with the primary keyword on a computer display;
determining a quantity related to a countable event associated with the primary keyword and each of the secondary keywords, wherein the countable event comprises an order of an item corresponding to the secondary keyword following a selection of the primary keyword by at least one customer;
determining a degree of association between the primary keyword and a plurality of secondary keywords based at least in part on the quantity determined for each of the secondary keywords; and
causing a display of a plurality of nodes on the computer display, wherein each of the nodes corresponds to one of the plurality of secondary keywords,
wherein a characteristic of each of the plurality of nodes is determined based at least in part on the degree of association between the primary keyword and the secondary keyword corresponding to each of the plurality of nodes.

20. The method according to claim 19, wherein the countable event further comprises a review of information corresponding to the secondary keyword following the selection of the primary keyword by at least one customer.

21. The method according to claim 19, wherein the countable event further comprises an order of an item corresponding to the secondary keyword following an order of an item corresponding to the primary keyword by at least one customer.

22. The method according to claim 19, wherein the degree of association is determined at least in part according to the equation:

$$A_{PS_i} = \frac{Q_{PS_i}}{\sum_{i=1}^{n} Q_{PS_i}}$$

wherein n is the number of the plurality of secondary keywords, P is the primary keyword, $S_i$ corresponds to one of the plurality of secondary keywords, $A_{PS_i}$ is the degree of association between the primary keyword P and the one of the plurality of secondary keywords $S_i$, $Q_{PS_i}$ is the quantity related to the countable event associated with the primary keyword P and the one of the plurality of secondary keywords $S_i$, and $\Sigma Q_{PSi}$ is the sum of the quantities related to the countable event associated with the primary keyword P and the plurality of secondary keywords $S_i$ through $S_n$.

23. The method according to claim 19, wherein the nodes are displayed in an arrangement on the computer display, and wherein the arrangement is determined based at least in part on the degrees of association between the primary keyword and each of the plurality of secondary keywords.

24. The method according to claim 19, wherein a characteristic of each of the plurality of nodes is selected based at least in part on the degree of association between the primary keyword and the secondary keyword corresponding to each of the plurality of nodes.

25. The method according to claim 19, wherein the degree of association between the primary keyword and the plurality of secondary keywords is based at least in part on a profile of the customer.

26. The method according to claim 25, wherein the profile comprises information corresponding to at least one of an age, a location, a purchasing history, a viewing history or a personal preference of the customer.

27. The method according to claim 19, wherein the degree of association between the primary keyword and the plurality of secondary keywords is determined based at least in part on a time when the primary keyword was selected by the customer.

28. A computer-implemented method for recommending items to a customer comprising:
   causing a display of a hub associated with a primary item on a computer display;
   causing a display of a plurality of nodes on the computer display, wherein each of the nodes is associated with a secondary item;
   determining a first quantity related to a countable event associated with the primary item and each of the secondary items during a first period of time;
   determining a second quantity related to the countable event during a second period of time; and
   wherein a characteristic of each of the nodes on the computer display is based at least in part on at least one of the first quantity or the second quantity for each of the secondary items, and
   wherein the countable event is an order of the secondary item following a selection of the primary item by at least one customer.

29. The method according to claim 28, wherein a characteristic of each of the nodes on the computer display is based at least in part on a comparison of the first quantity to the second quantity for each of the secondary items.

30. The method according to claim 28, wherein at least one of a size, a shape or a color of at least one of the plurality of nodes is based at least in part on at least one of the first quantity or the second quantity for the at least one of the secondary items associated with the at least one of the plurality of nodes.

31. The method according to claim 28, further comprising causing a display of a plurality of tethers on the at least one computer display,
   wherein each of the plurality of tethers links the hub to one of the plurality of nodes.

32. The method according to claim 28, further comprising:
   selecting at least one of a size, a length, a weight or a color of a tether based at least in part on at least one of the first quantity or the second quantity for each of the secondary items.

33. The method according to claim 28, wherein the second period of time is at least one of shorter in duration or more recent in time than the first period of time.

34. A computer system having a computer that executes a computer program causing the computer system to perform a method comprising:
   causing a display of a hub corresponding to a primary item in a position on at least one computer display;
   identifying a predetermined number of secondary items associated with the primary item;
   causing a display of a plurality of primary nodes around the hub on the at least one computer display, each of the plurality of primary nodes corresponding to an individual secondary item;
   causing a display of a plurality of primary tethers, each of the plurality of primary tethers extending between the hub and one of the plurality of primary nodes;
   accepting a selection of at least one primary node;
   identifying a predetermined number of tertiary items associated with the secondary item corresponding to the selected primary node;
   repositioning the hub and at least one of the primary nodes on the at least one computer display, wherein the selected primary node is repositioned to the position;
   causing a display of a plurality of secondary nodes around the selected primary node, each of the plurality of secondary nodes corresponding to an individual tertiary item;
   causing a display of a plurality of secondary tethers, each of the plurality of secondary tethers extending between the selected primary node and one of the plurality of secondary nodes;
   accepting a selection of a location on the at least one computer display; and
   moving at least one of the hub, one of the primary nodes or one of the secondary nodes in a direction parallel to a line extending between the position and the location on the at least one computer display, and in a distance equal to the distance between the position and the location on the computer display.

35. The computer system according to claim 34, wherein at least one of a location, a size, a shape or a dimension of at least one of the plurality of primary nodes is determined based at least in part on a degree of association between the primary item and the secondary item corresponding to the at least one of the plurality of primary nodes.

36. The computer system according to claim 34, wherein the method further comprises:
- accepting an entry of a gesture on the at least one computer display, wherein the gesture includes at least one of a dimension or a direction; and
- moving at least one of the hub, one of the primary nodes or one of the secondary nodes at least one of by the dimension or in the direction.

* * * * *